United States Patent
Jarvinen

(10) Patent No.: US 8,060,334 B1
(45) Date of Patent: Nov. 15, 2011

(54) AIRCRAFT PITOT-STATIC TUBE WITH ICE DETECTION

(76) Inventor: Philip Onni Jarvinen, Amherst, NH (US)

( * ) Notice: Subject to any disclaimer, the term of this patent is extended or adjusted under 35 U.S.C. 154(b) by 0 days.

(21) Appl. No.: 12/807,428

(22) Filed: Sep. 3, 2010

(51) Int. Cl.
*G01K 17/00* (2006.01)

(52) U.S. Cl. ............ 702/136; 702/3; 702/24; 702/54; 702/57; 702/59; 702/75; 702/130; 73/24.01; 73/24.04; 73/170.26; 340/582; 340/962

(58) Field of Classification Search ........... 702/3, 24, 702/54, 57, 58, 59, 75, 130, 136; 73/24.01, 73/24.04, 170.26; 340/582, 962
See application file for complete search history.

(56) References Cited

U.S. PATENT DOCUMENTS

| | | | |
|---|---|---|---|
| 1,620,633 A | 3/1927 | Colvin | |
| 1,971,534 A | 8/1934 | Peace, Jr. | |
| 2,042,700 A | 6/1936 | Colvin | |
| 2,179,500 A | 11/1939 | Diehl | |
| 2,204,367 A | 6/1940 | Kollsman | |
| 6,679,112 B2 | 1/2004 | Collot et al. | |
| 6,817,240 B2 | 11/2004 | Collot et al. | |
| 6,847,903 B2* | 1/2005 | Severson et al. | 702/54 |
| 7,124,630 B2 | 10/2006 | Hanson et al. | |
| 7,155,968 B2 | 1/2007 | Collot et al. | |
| 7,439,877 B1 | 10/2008 | Jarvinen | |

OTHER PUBLICATIONS

"Pitot-Static Tube-Prandtl Tube" http://www.grc.nasa.gov/WWW/K-12/airplane/pilot.html.
"Air France Flight 447" http://en.wikipedia.org/wiki/Air France Flight 447.

* cited by examiner

*Primary Examiner* — Sujoy Kundu

(57) ABSTRACT

An aircraft Ice Detection pitot-static tube is described which uses sensors integrated into the pitot-static tube to determine when and where the pitot-static tube is icing up. Temperature, thermal conductivity and impedance sensor measurements are combined with a mathematical transfer of the impedance sensor output into the complex dielectric plane to identify that the material accreating on the exterior and interior of the pitot-static tube is ice and only ice. Identification of ice realized when the trace in complex dielectric space has a distinctive semi-circular form, which only ice exhibits, with measured values in agreement with reference laboratory data stored in the onboard computer system.

10 Claims, 6 Drawing Sheets

AIRCRAFT PITOT-STATIC TUBE WITH ICE DETECTION

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention provides a solution to the problem of detecting when aircraft pitot-static tube icing renders the pitot-static tube incapable of performing its function of accurately sensing the flight velocity of the aircraft upon which it is mounted. The invention includes ice detectors added integral to the pitot-static tube which sense any ice buildup on the outside surface of the pitot-static tube, any ice blocking the entrance to the pitot-static tube and any ice buildup internal to the pitot-static tube itself; situations which may prevent normal pitot-static tube operation. When the presence of icing of the pitot-static tube is detected, a warning signal is provided to related aircraft control and safety systems and to the pilots of the aircraft that warns that a particular pitot-static tube is iced, can no longer be trusted as a flight velocity measuring device and its output must be rejected from further use.

BACKGROUND OF INVENTION

Numerous aircraft crashes have been attributed to false readings of aircraft flight velocity by pitot-static tube measuring devices mounted on the aircraft. A pitot-static tube senses aircraft velocity by measuring the difference between free stream total pressure and local static pressure; the difference between these two pressures being the dynamic pressure as known from Bernoulli's equation. Flight velocity is then computed from dynamic pressure using the air density calculated from knowledge of the atmospheric temperature and the static pressure; the temperature being measured independently.

An ordinary pitot-static tube sensor, as described in "Pitot-Static Tube-Prandtl Tube", http://www.grc.nasa.gov/WWW/K-12/airplane/pilot.html, consists of a hollow tube, enclosed in an aerodynamic fairing, with the hollow inner tube leading to an inner chamber closed on its downstream end. The pitot-static tube sensor faces into the oncoming free stream flow with the air which enters the tube producing the free stream total pressure level after the air is decelerated to zero velocity in the inner tube and inner chamber of the pitot-static tube. The static pressure signal is obtained from a flush mounted static pressure port usually facing outward thru the side of the pitot-static tube. The dynamic pressure is measured in one embodiment of the ordinary pitot-static tube sensor by placing a pressure measuring transducer in the inner chamber with the free stream total pressure facing against one side of the pressure measuring diaphragm and with the static pressure on the other: the pressure difference across the diaphragm being the dynamic pressure which is equal to one half the atmospheric density times the free stream velocity (V) squared. The pitot-static tube is normally constructed from metal.

The velocity measuring pitot-static tube operates on the basis that it is operating properly if there is no obstruction of the free stream flow as it enters into or slows to zero velocity inside the hollow inner tube and inner chamber and no interference or blockage of the static pressure port providing the static pressure signal. In some pitot-static tube installations, the pitot-static tube is mounted on a vane which is free to rotate in pitch angle so that the pitot-static tube always faces directly into the oncoming flow. Early examples of patents granted on pitot static tubes (without the ice, sleet, frost, deicing fluid, rain water and snow detection capabilities of the present invention) in the period from 1927 thru 1940 include patents, for example, by Colvin in U.S. Pat. No. 1,620,633, by Peace, Jr. in U.S. Pat. No. 1,971,534, by Colvin in U.S. Pat. No. 2,042,700, by Diehl in U.S. Pat. No. 2,179,500, by Kollsman in U.S. Pat. No. 2,204,367.

U.S. Pat. No. 1,620,633 offers a pitot-static tube sensor constructed using two separate tubes strapped together for support: one that measures the free stream total pressure and the other measuring the free stream static pressure: with the two tubes supplying the pressures so measured to an airspeed transducer or airspeed indicator. In contrast, the pitot-static tube of U.S. Pat. No. 1,971,534 combines the measurement of free stream total pressure and free stream static pressure in a single tubular structure with two chambers, one chamber for each of the two pressures, and also equips the pitot-static tube with an electric heater to melt ice, frost or packed snow forming on the upstream open end of the pitot-static tube.

In U.S. Pat. No. 2,042,700, a single tubular structure with two chambers is also used with a baffle in its upstream end that prevents ice, frost or snow from entering the pitot-static tube and allows any melted snow or ice melted by an electric heater to run out the upstream end of the tube. An electric heater is provided in this patent so that the pitot-static tube may function properly when flying thru cold or inclement weather. In U.S. Pat. No. 2,179,500, the pitot-static tube incorporates heating of the pitot-static tube using electrical energy or heating thru the use of the aircraft's engine exhaust. In U.S. Pat. No. 2,204,367, drains are added to the pitot-static tube to allow water, which forms from ice, frost or snow melted by an electric heater or from incident rain, to drain overboard near the upstream end of the pitot-static tube. The pitot-static-tube is also equipped with a downstream trapping chamber with drain that traps and then drains any water that may make it that far downstream in the pitot-static tube.

Heating of the pitot-static tube to allow operation in icing, frost and snow conditions and the use of baffles and drains holes, as done in these early pitot-static tube patents, has continued to be features included in all pitot-static tubes used on present day commercial aircraft as well as included in the present invention.

More recently, pitot-static tubes have been mounted on vanes that rotate in response to aircraft pitching motions to keep the pitot-static tube facing at all times directly into the oncoming free stream flow. Examples of vane mounted pitot-static include patents by Collot et al in U.S. Pat. No. 6,679,112, by Collot et al in U.S. Pat. No. 6,817,240, by Hanson et al in U.S. Pat. No. 7,124,630 and by Collot et al in U.S. Pat. No. 7,155,968. No prior art has been found that equips a pitot-static tube with the ability to sense when ice, sleet, frost, deicer fluid, rain water or snow has attached itself to the exterior of the pitot-static tube or has partially or fully filled the inner entrance tube or has partially or fully filled the inner chamber or has partially or fully covered the static pressure measuring taps on the side of the pitot-static tube: information that the present invention provides when the Ice Detection pitot-static tube is used in fixed positions or mounted on rotatable vanes.

In a number of prior aircraft crashes, pitot-static tube velocity readings are suspected as having been false due to icing and are believed to have lead to the crash. One example of a crash, as described in "Air France Flight 447", http://en.wikipedia.org/wiki/Air_France_Flight_447, believed to be due to ice collecting on or in one or more of the aircraft's pitot-static tubes during flight is that of Air France Flight 447 which on 1 Jun. 2009 crashed into the Atlantic Ocean on a flight from Rio de Janeiro, Brazil to Paris, France with the loss of 216 passengers and 12 crew members. In this accident, Air France Flight 447 was flying at a flight altitude of 35,000 ft (11000 m) and at a speed of 467 knots (865 Km/h/537 mph) just prior to the crash.

To date, claims of false pitot-static tube velocity readings leading to aircraft crashes are conjecture for there is no existing evidence that icing was indeed the cause. The absence of evidence is due to the fact that existing pitot-static tubes used on commercial passenger aircraft, as well as on all aircraft employing pitot-static tubes, are not instrumented for detecting the presence of ice, sleet, frost, deicer fluid, rain water or snow. Also, no prior experimental measurements are available which might provide an understanding of how ice buildups in flight on and in a pitot-static tube and how icing might effect, to some degree, the operation of a pitot-static tube velocity measuring device.

Reviews of prior commercial jet crashes from high altitudes have led to the tentative conclusion by the aviation community that pitot-static tube icing may be a common factor in these crashes. It is also noted in a recent review that pitot-static tube icing might be a factor in the crash of Air France Flight 447 for it was operating in a cold environment at 35,000 feet altitude which is a common factor with some of the previous crashes. However, no prior art was found to exist for a pitot-static tube with the ice, sleet, frost, deicer fluid, rain water or snow detection features of the present invention.

SUMMARY OF THE INVENTION

The present invention is for a pitot-static tube with ice detection sensors added integral to the pitot-static tube; from hereon referred to as the ICE Detection pitot-static tube. Three types of sensors are incorporated in the Ice Detection pitot-static tube of the present invention and are used to detect the presence of ice, sleet, frost, deicer fluid, rain water and snow and its buildup externally on the Ice Detection pitot-static tube and internally within the entry tube and in the inner chamber of the pitot-static tube. The three types of sensors added in the present invention to the ordinary pitot-static tube include temperature, thermal conductivity and electrical impedance measuring sensors, respectively. The addition of sensors not changing the streamlined shape of the ordinary pitot-static tube The temperature sensors in the present invention are distributed on the outer surface of the Ice Detection pitot-static tube and on the inside of its inner entry tube and inner chamber. The temperature sensors are used to measure the physical temperatures over the Ice Detection pitot-static tube body to assure that all parts of the pitot-static tube are below 32 degrees Fahrenheit (0 degrees Centigrade) so that freezing conditions are known to exist.

The thermal conductivity sensors in the present invention are provided to measure the thermal conductivity values of any material accreated in flight and overlying the outside surface of the Ice Detection pitot-static tube or any material deposited inside the entry tube or inner chamber of the Ice Detection pitot-static tube. The measured values of the thermal conductivity are used to differentiate between the presence of different materials including ice, sleet, frost, deicer fluid, rain water, snow and air.

The impedance sensors in the present invention are in the form of electrodes placed flush on the outside surface of the Ice Detection pitot-static tube and on the inside of the inner entry tube and inner chamber. Impedance is measured between any two electrodes by electrically exciting the electrodes over a band of frequencies while maintaining a voltage across the electrodes. In one embodiment of the present invention, an impedance measurement device known as Analog Devices Model AD 5933, "IMSPS, 12-Bit Impedance Converter, Network Analyzer chip is used to make the impedance measurements because of its low power drain, high precision in making the measurements and small size measuring 6.2 mmW×7.8 mmD×2.0 mmH. When any two electrodes are electrically excited for an impedance measurement, an electric field radiates in straight lines or arcs from one electrode to another, depending on the relative position, tilt and shape of one electrode with respect to the other. The electric field, so radiated, passes thru any deposited material overlying the two electrodes and the changes in electric field due to the type and extent of the overlying material effects the value of impedance that is measured.

In a preferred embodiment of the present invention, the measurement of electrical impedances of materials accreated on and overlying the external surface of the pitot-static tube or any material deposited within the inner tube or inner chamber of the pitot-static tube is enhanced by constructing the Ice Detection pitot-static tube of a physically strong but poor electrically conducting metal. The use of a poor electrically conducting metal for the main structure of the Ice Detection pitot-static tube upon which the electrodes are attached causes the electrical fields radiating from the impedance electrodes to be concentrated in the overlying and deposited materials that are to be identified rather than being radiated more diffusely if a highly conducting metal were used. In one embodiment of the present invention, titanium metal is the preferred metal to be used for the main structure of the Ice Detection pitot-static tube because of its high strength and relatively low electrical conductivity.

In another embodiment of the present invention where electrodes are mounted on a high electrically conductive Ice Detection pitot-static tube metal structure, the electrodes are mounted on top of electrically insulating material to enhance the electrical measurement of impedances of materials overlying the external surface of the Ice Detection pitot-static tube or any material deposited within the inner tube or inner chamber of the Ice Detection pitot-static tube. The application of electrically insulating material under the electrodes concentrates the electric field radiated by the electrodes into the overlying materials on the outside of the Ice Detection pitot-static tube or those deposited in the inner tube and inner chamber.

The technique used to identify the presence of ice in the present invention is based on the temperature, thermal conductivity and impedance measurement technique described in U.S. Pat. No. 7,439,877 entitled "Total Impedance And Complex Dielectric Property Ice Detection System" by Philip Onni Jarvinen, author of the present patent application, which is incorporated in this patent application by reference. First, measurement of temperatures is done to assure that the Ice Detection pitot-static tube it is cold enough for ice to be present as a solid. This is followed by measurement of the thermal conductivity value of any overlying or internally deposited material with the values of thermal conductivity used to differentiate ice from entrapped or clinging ice, sleet, frost, deicing fluid, rain water and snow. If ice is indicated by a correct value of the measured thermal conductivity, impedance scans are conducted next.

Conversion of the measured impedance data to the complex dielectric plane via a mathematical transform follows with the shape of the trace in the complex dielectric plane used to absolutely differentiate between ice, sleet, frost, deicing fluid, rain water, and snow since only ice exhibits a distinctive semicircular shaped trace in the complex dielectric plane. The diameter of the semicircular trace in the complex dielectric plane along with intercept values of the trace on the horizontal axis of the complex dielectric plane, providing minimum and maximum values of the ordinary relative permittivity respectively, are used to determine the thickness of ice overlying a particular set of electrodes.

The impedance measuring electrodes of the present invention which are placed at various locations on the surface of and within the Ice Detection pitot-static tube are of three different types: complete annular rings, segmented annular rings and planar electrodes. Each of the complete annular ring electrodes and each of the segmented annular ring electrodes and planar electrodes is connected electrically by wires to impedance measuring electronic chips in an electronic box located within the aircraft's outer surface; the electronic box located above the butt end of the pitot-static tube where the pitot-static tube is attached to the aircraft.

The electronics box contains a system controller, multiplexer, processor, computer system with software, data storage devices and mathematical transforms, impedance measuring electronic chips, heater and communication unit; the latter communication unit connected to the pilots and to aircraft control and safety systems and used to send a warning signal to them should icing of a pitot-static tube be detected. The controller operates continuously in time to connect a pair of selected annular rings or a pair of selected segmented electrodes or a pair of planar electrodes to the impedance measuring electronic chips. The controller also operates simultaneously to attach one of the two selected annular rings or one of the two selected segmented annular ring electrodes or one of two planar electrodes to the electrical ground prior to making the impedance measurement; the controller controlling electrode selection as well as the grounding of particular electrodes.

The features and advantages described herein are not all inclusive and, in particular, many other additional features and advantages will be apparent to one of ordinary skill in the art, in view of the drawings, specifications and claims. Moreover, it should be noted that the language used in the specifications has been principally selected for its readability and instructional purposes, and not to limit the scope of the inventive subject matter.

DETAILED DESCRIPTION

Figure 1:
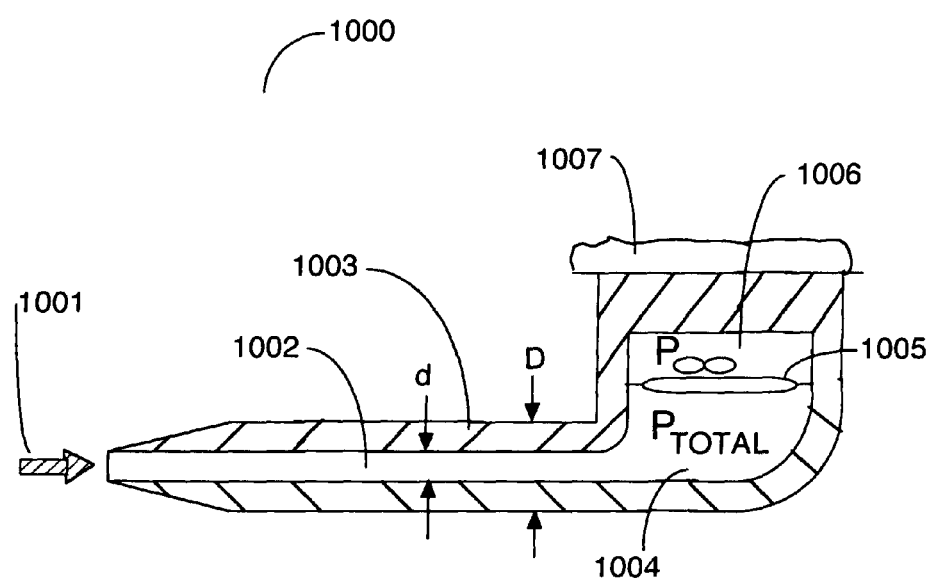
FIG. 1 is a side view in cross section of an ordinary pitot-static tube illustrating its features.

Referring now to the drawings and in particular to FIG. 1 which is a side view, cross sectional drawing, 1000, of an ordinary pitot-static tube illustrating its features which include an aerodynamic fairing in the form of a cylindrical barrel 1003, with outer diameter D, which surrounds an open inner tube 1002 of diameter d. The open inner tube faces into the oncoming free stream flow 1001 and connects downstream to an inner chamber 1004 closed on its downstream end. A pressure transducer 1005 is schematically shown in FIG. 1, 1000, to bridge from the upstream side of the inner chamber to its downstream side and has two pressures acting differentially against the diaphragm of the pressure transducer: the total pressure of the free stream, P sub total, acting on the side facing the upstream airflow coming into the inner chamber 1004 and the static pressure, P sub infinity, acting on the other side. The static pressure, P sub infinity, is piped to the inner chamber from a flush mounted hole (not shown) usually located on the side of the pitot static tube. The pitot-static tube attaches to the surface of the aircraft 1007. The ordinary pitot-static tube in FIG. 1, 1000, is also equipped with an electric heater (not shown) to melt any ice or snow and equipped with drains (not shown) to allow any liquids so produced to drain from the pitot-static tube into the surrounding atmosphere.

Figure 2:
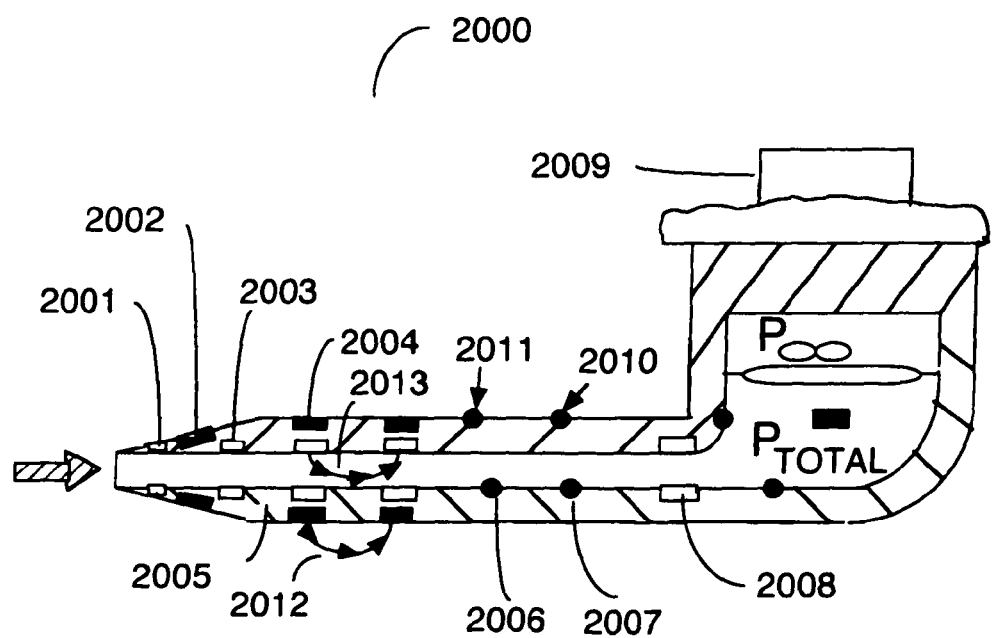
FIG. 2 is a side view in cross section of a Ice Detection pitot-static tube of the present invention with Ice Detection sensor locations on the barrel of the pitot-static tube noted.

FIG. 2, 2000, is a drawing showing a side view in cross section of the Ice Detection pitot-static tube of the present invention with positions noted for the three different types of sensors; temperature, thermal conductivity and impedance sensors on the external and internal surfaces of the barrel of the Ice Detection pitot-static tube. The body of the Ice Detection pitot-static tube may be of metal of high electrical conductivity or low electrical conductivity or may be fabricated of composite materials; with low electrical conductivity preferred.

Possible positions for temperature sensors on the barrel of the Ice Detection pitot-static tube of the present invention are noted by locations 2006 and 2007 on the inner tube surface and 2010 and 2011 on the outer surface. Temperature sensor positions are shown towards the downstream end of the barrel in FIG. 2, 2000, but temperature sensors may also be placed toward the upstream end of the barrel. One embodiment of the present invention employs glass enclosed thermistors at locations 2006 and 2007 or 2010 and 2011; the thermistors are used to provide both temperature measurements and values of the thermal conductivities of overlying materials by the self heated thermistor approach of J. W. Valvano described in U.S. Pat. No. 7,439,877, column 11, paragraphs 2 and 3. The glass encapsulated thermistors used in that approach are spherical in shape and are mounted with half of the thermistor below the level of the local surface and with half of the thermistor protruding above the local surface.

Possible positions for impedance electrodes located on the external surface of the Ice Detection pitot-static tube barrel are noted at 2002 and 2004 with additional electrodes of the same type indicated (refer to the filled rectangles) but not identified by number in FIG. 2, 2000. Impedance electrodes 2002 and 2004 may be of the continuous annular ring type or the segmented annular ring type as shown in greater detail in FIG. 4 and FIG. 5, respectively. An electric heating device and liquid drains are features included in the Ice Detection pitot-static tube of the present invention but are not shown in FIG. 2, 2000.

Possible positions for impedance measuring electrodes on the wall of the inner tube of the Ice Detection pitot-static tube barrel are located at 2001 and 2003 with additional electrodes of the same type (refer to the open rectangles) indicated on the barrel but not identified by number in the figure. Impedance electrodes 2001 and 2003 are of the continuous annular ring type or the segmented annular ring type; the latter type shown in greater detail in FIG. 6. A representative electric field line is noted between two impedance sensors in the inner tube as indicates by the curved line 2013 and on the outer surface as indicated by curved line 2012. Though only one field line is shown between impedance sensors in the inner tube and on the outer surface for clarity, in actuality, there are a plethora of field lines filling the space between each pair of impedance electrodes.

Figure 3:
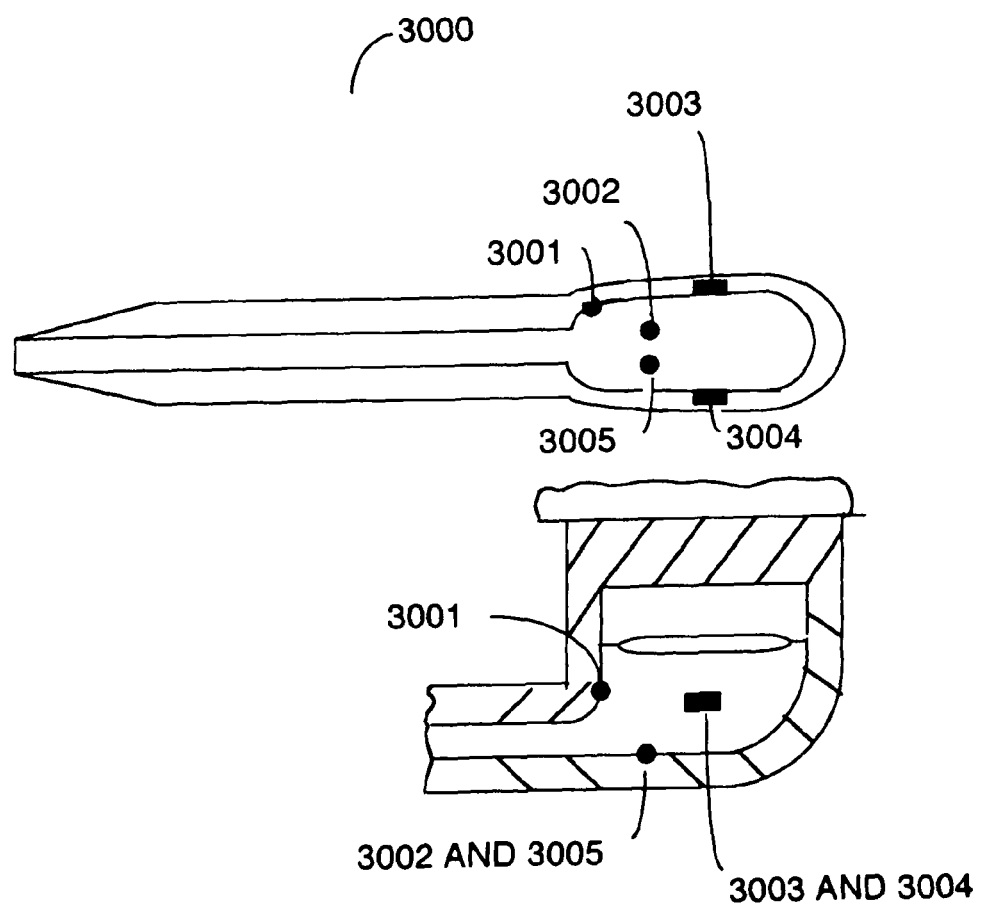
FIG. 3 includes a plan view in cross section and a side view of the inner chamber in partial cross section of the ICE Detection pitot-static tube of the present invention showing sensor locations in that chamber.

Possible positions for temperature, thermal conductivity and impedance measuring sensors in the inner chamber of the Ice Detection pitot-static tube of the present invention are shown in FIG. 3, 3000. In FIG. 3, 3000, temperatures are measured at 3001, 3002 and 3005. The thermal conductivity of any material such as ice, sleet, frost, rain water, deicer fluid, and snow in the inner chamber is measured in the embodiment depicted by locating thermistor sensors 3002 and 3005 as shown and following the self heated thermistor approach. The impedance sensor which consists of planar electrodes 3003 and 3004 measures the amount of material and the type of material located in the inner chamber between the two electrodes. Though only one pair of planar impedance sensors is shown in FIG. 3, 3000, additional impedance sensors may be positioned above or below the plane of the first sensor combination to provide measurements of the variation of the amount of material in the vertical direction in the inner chamber.

It should be noted that the locations shown in FIG. 2 and FIG. 3 for temperature, thermal conductivity and impedance measuring sensors are representative of possible sensor locations. The actual sensor locations incorporated in the Ice Detection pitot-static tube depend to a degree on the number of sensors deemed necessary to map each of the three variables: temperature, thermal conductivity and impedance. Also, different types of sensors may be utilized in different embodiments of the Ice Detection pitot-static tube to make the same type of measurement. Temperatures may be measured with thermocouples as well as with thermistors and there are numerous ways to measure thermal conductivity other than using the two thermistor, self heated approach previously mentioned.

Figure 4:
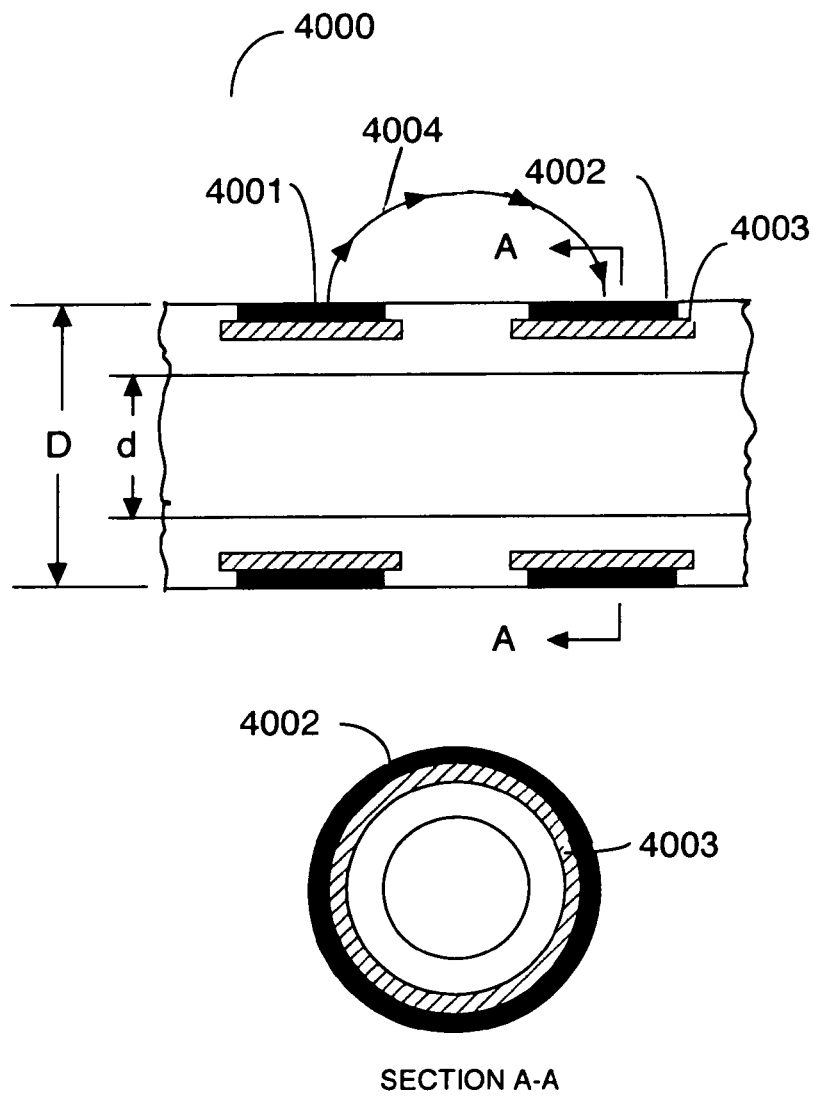
FIG. 4 is a drawing of a portion of the barrel of the Ice Detection pitot-static tube of the present invention in side view cross section and in end view cross section at station A-A illustrating possible positions for external continuous annular ring impedance measuring electrodes.

FIG. 4, 4000, illustrates annular ring electrodes mounted flush with the external surface of the barrel of the Ice Detection pitot-static tube of the present invention with the width of the rings 4001 and 4002 enlarged for clarity. The cross sectional drawing A-A, in FIG. 4, 4000, shows the continuous nature of an annular ring electrode around the outer surface of the barrel. Also illustrated in FIG. 4, 4000, is how electrically insulating material 4003 is placed under the electrodes in an embodiment utilizing a high electrically conducting metal structure rather than a poorly conducting metal. The electrically insulating material thus concentrating the electric field in the desired direction for impedance measurements. A representative electric field line 4004 is noted between annular ring electrodes 4001 and 4002.

Figure 5:
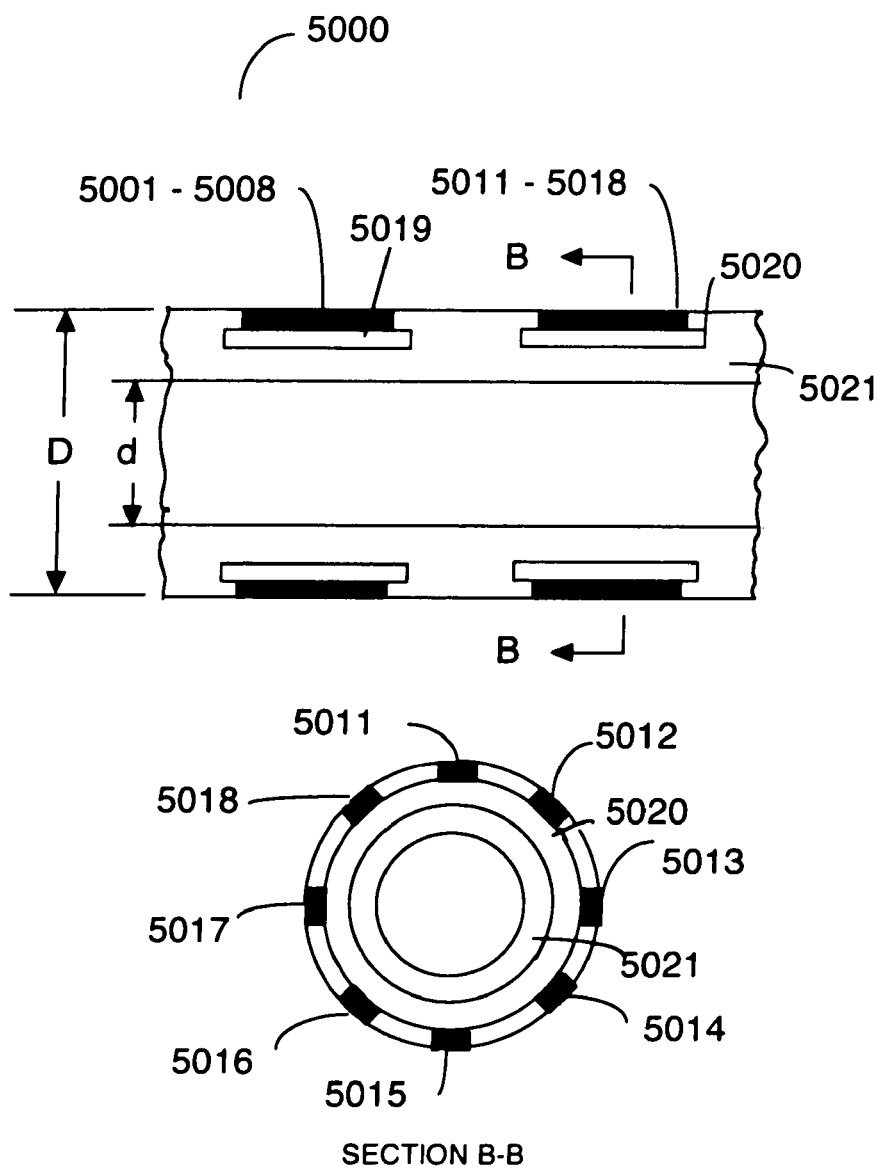
FIG. 5 is a drawing of a portion of the barrel of the Ice Detection pitot-static tube of the present invention in side view cross section and in end view cross section at station B-B illustrating possible positions for external segmented impedance measuring electrodes.

FIG. 5, 5000, illustrates segmented annular ring electrodes placed flush on the exterior surface on the Ice Detection pitot-static tube of the present invention for the case where the segmented annular ring electrodes are supported on a poorly conducting metal structure. If a conducting metal structure is used to support the segmented electrodes, electrically insulating materials 5019 and 5020 are added to direct the electric field of the electrodes in a more outward direction and into any accreated and overlying material on the outside of the barrel of the Ice Detection pitot-static tube, if present. The width of the ring segments 5001 thru 5008 and 5011 thru 5018 are enlarged for clarity.

Figure 6:
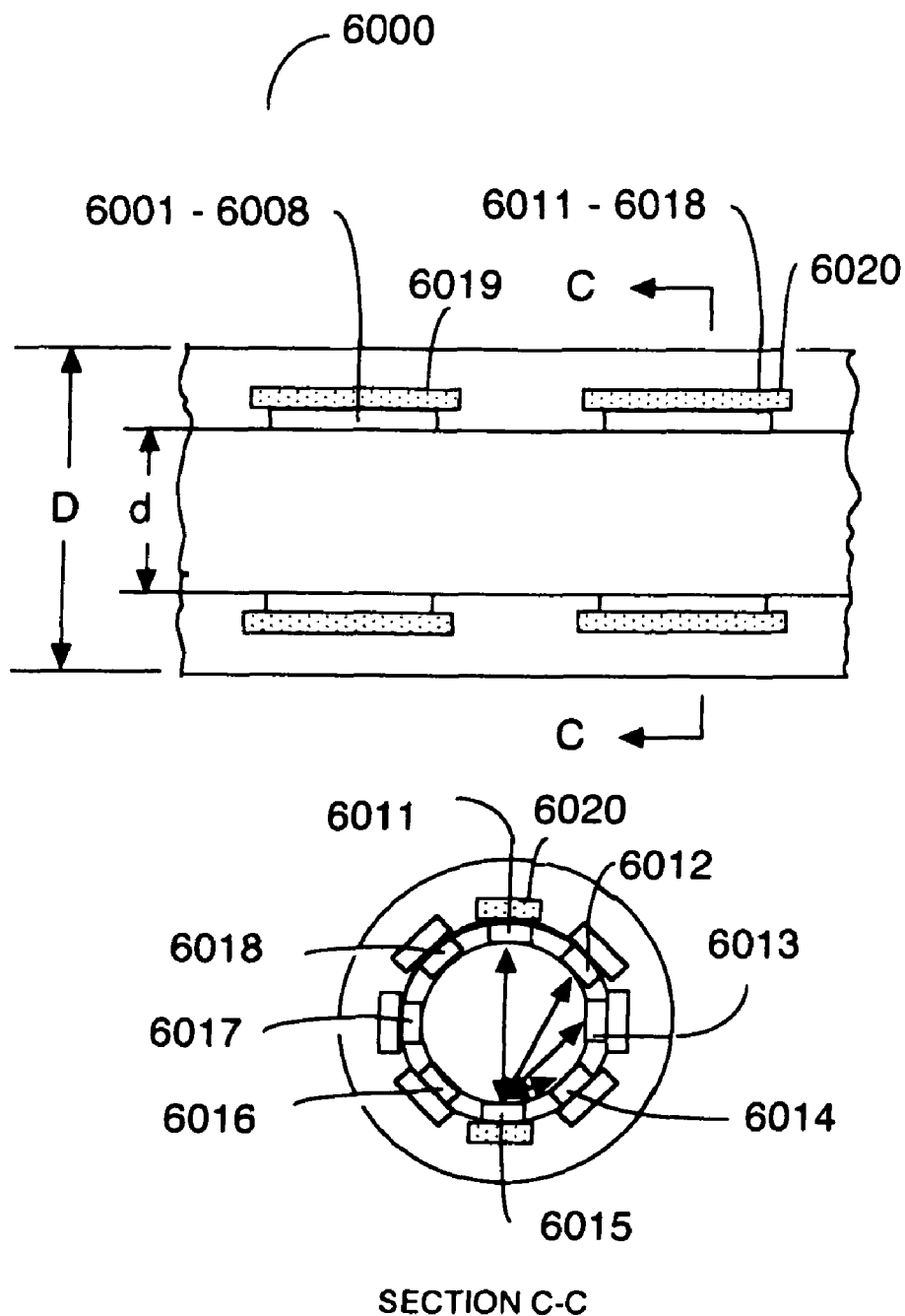
FIG. 6 is a drawing of a portion of the barrel of the Ice Detection pitot-static tube of the present invention in side view cross section and in end view cross section at station C-C illustrating possible positions on the inner tube for segmented impedance measuring electrodes.

FIG. 6, 6000, illustrates segmented annular ring electrodes placed flush on the surface of the inner tube of the Ice Detection pitot-static tube of the present invention for the case where the segmented annular ring electrodes are supported on a poorly conducting metal structure. The width of the two rings of electrodes, 6001 thru 6008 and 6011 thru 6018 respectively, are enlarged for clarity. If conducting metal is used for the supporting structure, electrically insulating materials 6019 and 6020 are added under electrodes 6001 thru 6008 and 6011 thru 6018 as shown. During the times when impedance measurements are being taken, the controller selects one electrode, for instance 6015, and then sequentially measures the impedance between it and 6011, then between it and 6012, and then between it and 6013 and then between it and 6014 as indicated in 6000 by the solid lines with arrow heads on each end. The impedance measurements so taken providing the amount and thickness of material between electrode 6015 and the other electrodes and also providing information as to what type of material is present in the inner tube: ice, sleet, frost, deicer fluid, rain water, snow or air.

Please note that the controller may select any electrode other then 6015, and carry out the same process of measuring impedances between it and all other electrodes on the surface of the inner tube in the same ring of electrodes to obtain similar information on the amount, thickness and type of material between the two electrodes. The impedances may also be measured between any electrode on the upstream ring of electrodes 6001 thru 6008 and any electrode on the downstream ring of electrodes 6011 thru 6018 to obtain information on the amount, thickness and type of material present between the two electrodes.

The foregoing description of the embodiments of the invention has been presented for the purpose of illustration and description. It is not intended to be exhaustive or to limit the patent to the precise form disclosed. Many modifications and variations are possible in the light of this disclosure. It is intended that the scope of the invention be limited not by the detailed description, but rather by the claims appended hereto.

I claim:

1. A machine named an Aircraft Pitot-Static Tube with Ice Detection comprising:
    means to identify that the temperature of the entire body of the Aircraft Pitot-Static Tube with Ice Detection is below 32 degrees Fahrenheit (0 degrees Centigrade) to assure that frozen conditions of the Aircraft Pitot-Static Tube with Ice Detection are present and ice accreation is possible by the addition of temperature sensors to the Aircraft Pitot-Static Tube with Ice Detection;
    means to measure the thermal conductivity of materials accreated on the exterior and partially or totally filling the interior of the Aircraft Pitot-Static Tube With Ice Detection by the addition of thermal conductivity sensors to the Aircraft Pitot-Static Tube With Ice Detection;

means to use the thermal conductivity values measured by the thermal conductivity sensors to differentiate between ice, sleet, frost, deicer fluid, rain water and snow through comparison with reference laboratory measured data;

means to identify when icing, sleeting, deposition of frost and buildup of snow on and in the Aircraft Pitot-Static Tube with Ice Detection is initially occurring by the addition of thermal conductivity sensors to the Aircraft Pitot-Static Tube with Ice Detection;

means to identify the history of icing, sleeting, deposition of frost and buildup of snow accreated on the exterior of Aircraft Pitot-Static Tube with Ice Detection and within its inlet tube and within its inner chamber by the addition of thermal conductivity and impedance sensors to Aircraft Pitot-Static Tube with Ice Detection;

means to measure the variation with frequency of the electrical impedance of materials accreated on the exterior and partially or totally filling the interior of Aircraft Pitot-Static Tube with Ice Detection by the addition of impedance sensors to the Aircraft Pitot-Static Tube with Ice Detection;

means to make three measurements on the exterior surface and interior surfaces of Aircraft Pitot-Static Tube with Ice Detection using sensors that measure temperature, thermal conductivity and electrical impedance of materials, including ice, sleet, frost or snow, that are accreated on the exterior of and partially or totally filling the interior of Aircraft Pitot-Static Tube with Ice Detection;

means to transform electrical impedance data, measured on materials accreated on the exterior of and partially or totally filling the Aircraft Pitot-Static Tube with Ice Detection, into the complex dielectric plane which takes into account the relative geometry and distances between any two electrodes;

means to make a determination whether the transformed impedance data does or does not exhibit a semicircular signature in the complex dielectric plane; the presence of a distinct semicircular signature absolutely identifying the material under test as ice and only ice; no other of the possible materials exhibiting such a distinctive signature;

means to measure the thickness and extent of any icing accreated on the exterior of the Aircraft Pitot-Static Tube with Ice Detection and within its inlet tube and within its inner chamber based on measured complex dielectric values and features of the trace in the complex dielectric plane;

means to use the complex dielectric data to identify when Aircraft Pitot-Static Tube with Ice Detection is sufficiently fouled with ice, sleet, frost, deicer fluid, rain water and snow deposits on its exterior surface and inner tube and inner chamber that Aircraft Pitot-Static Tube with Ice Detection can not possibly operate properly;

means to notify the pilots of the aircraft and aircraft control and safety systems that sufficient icing has occurred on a particular Aircraft Pitot-Static Tube with Ice Detection to render it inoperative and eliminate it from further consideration by the pilots as well as by the aircraft's control and safety systems.

2. The Aircraft Pitot-Static Tube with Ice Detection recited in claim 1 further comprising a means to identify that the electric heater portion of the Aircraft Pitot-Static Tube with Ice Detection is operating properly and is maintaining the body of the Aircraft Pitot-Static Tube with Ice Detection at temperatures sufficiently above 32 Fahrenheit (0 degrees Centigrade) so that accumulation of ice, sleet, frost and snow on the Aircraft Pitot-Static Tube with Ice Detection is not possible by the addition of temperature sensors to the Aircraft Pitot-Static Tube with Ice Detection.

3. Apparatus for the detection of icing on and in an aircraft pitot-static tube consisting of an Aircraft Pitot-Static Tube with Ice Detection equipped with sensors, the sensors on the Aircraft Pitot-Static Tube with Ice Detection connected electrically to an electronics box located inside the aircraft which houses a computer system with stored reference laboratory data and real time data storage devices, the electronic box output connected electrically to a cockpit display device and to aircraft control and safety systems, the cockpit display unit providing audio and visual warnings that icing of a particular Aircraft Pitot-Static Tube with Ice Detection is beginning when icing of the pitot-static tube is detected, the Aircraft Pitot-Static Tube with Ice Detection system continuing to provide data about the thicknesses and locations of the ice on the exterior and interior of the Aircraft Pitot-Static Tube with Ice Detection after initial detection of icing occurs, comprising:

three types of sensors incorporated at several locations in and on the Aircraft Pitot-Static Tube with Ice Detection: temperature, thermal conductivity and impedance measuring sensors;

temperature sensors including thermocouple and thermistors on the surfaces of the Aircraft Pitot-Static Tube with Ice Detection and embedded in it;

thermal conductivity sensors including surface mounted thermistor pairs which employ the self heated approach to measure thermal conductivity of materials accreated and deposited over them including ice, sleet, frost, deicer fluid, rain water and snow;

impedance sensor electrodes in the form of continuous annular rings, segmented angular rings, and planar electrodes; the annular rings placed flush on the outside surface of the barrel of the pitot-static tube and inside on the wall of the inner inlet tube and the planar electrodes facing each other from opposite walls of the inner chamber;

the contents of the electronic box including a system controller, multiplexer, processor, computer system, data storage devices, software, impedance measuring electronic chips, heater and communication unit; the electronic box connected electrically to the Aircraft Pitot-Static Tube with Ice Detection sensors and in turn to a display unit in the cockpit as well as to aircraft control and safety systems;

a computer system which compares in-flight measured thermal conductivity values with reference laboratory data stored in the computer system and decides based on that comparison the type of accreated material present: ice, sleet, frost, deicer fluid, rain water or snow;

a display unit in the cockpit which provides a warning to the pilots in the form of an audio alert, flashing light and visual display so notifying the pilots of the initiation of icing, the status with time of icing on each of the redundant Aircraft Pitot-Static Tubes with Ice Detection and a pictorial display of the extent of icing on each Aircraft Pitot-Static Tube with Ice Detection.

4. Apparatus for the detection of icing on and in an aircraft pitot-static tube recited in claim 3 further comprising: the Aircraft Pitot-Static Tube with Ice Detection mounted fixed to the exterior of the aircraft or mounted on a vane that pivots with respect to the aircraft to keep the Aircraft Pitot-Static Tube with Ice Detection aimed into the oncoming airflow.

5. Apparatus for the detection of icing on and in the Aircraft Pitot-Static Tube with Ice Detection recited in claim 3 further comprising:
   thermal conductivity sensors that include two different classes of thermal conductivity sensors other than self heated thermistors to measure thermal conductivity; sensors that utilize existing steady state and non-steady state methods of measurement.

6. Apparatus for the detection of icing on and in the Aircraft Pitot-Static Tube with Ice Detection recited in claim 3 further comprising:
   software in the computer system in the electronics box controlling the selection of impedance sensor pairs of annular rings, annular ring segments and planar electrodes used to conduct the impedance measurements.

7. Apparatus for the detection of icing on and in the Aircraft Pitot-Static Tube with Ice Detection recited in claim 3 further comprising:
   apparatus where the body of the Aircraft Pitot-Static Tube with Ice Detection is formed from highly conducting electrical or poorly conducting electrical metals or composite materials where for the case of highly conducting electrical material, the impedance sensors are mounted on top of electrically insulating materials.

8. Apparatus for the detection of icing on and in the Aircraft Pitot-Static Tube with Ice Detection recited in claim 3 further comprising:
   the wiring of each sensor electrode to the computer system and data storage devices in the electronic box.

9. Apparatus for the detection of icing on and in the Aircraft Pitot-Static Tube with Ice Detection recited in claim 3 further comprising:
   apparatus where in the electronic box are located impedance measuring chips which electrically excite the impedance sensors for measurements of the variation of impedance as a function of excitation frequency.

10. An Aircraft Pitot-Static Tube with Ice Detection system that combines three measurements: temperature of the pitot-static tube, thermal conductivity of material deposited on and in the pitot-static tube and electrical impedance measurements of material deposits on and in the pitot-static tube, to determine whether the deposited material is ice, sleet, frost, deicer fluid, rain water or snow or other material and from the impedance measurements, through the application of a mathematical transform of the impedance data into the complex dielectric plane, establishing absolutely that the material under test is ice based on a distinctive semi-circular shaped signature only exhibited by ice in the complex dielectric plane; and comprising:
   a system which employs sensors mounted on the exterior and interior surfaces of a pitot-static tube to form an Aircraft Pitot-Static Tube with Ice Detection;
   a system that determines where ice is forming on a Aircraft Pitot-Static Tube with Ice Detection and provides as a function of time the physical thickness of the ice that has formed;
   a system that ranks the operability of each Aircraft Pitot-Static Tube with Ice Detection being used when icing is occurring and sends a signal to the pilots and to the aircraft's control and safety systems when icing has rendered aircraft velocity measurements by that particular Aircraft Pitot-Static Tube with Ice Detection no longer valid and further bans that Aircraft Pitot-Static Tube with Ice Detection from use for any future purpose, until rejuvenated by application of heat;
   a system that makes known to the pilots of the aircraft and to the aircraft's control and safety systems that a Aircraft Pitot-Static Tube with Ice Detection is no longer a viable instrument to be trusted and drops it from further consideration, until rejuvenated by the application of heat;
   a system that makes known to the pilots of the aircraft by both spoken word, flashing light and pictorial display as to what part of the Aircraft Pitot-Static Tube with Ice Detection is being or has been compromised: ice on the exterior of the Aircraft Pitot-Static Tube with Ice Detection closing off the inlet to the pitot-static tube or internally, ice closing off the inner tube or filling the inner chamber; each of these possibilities rendering the output of that particular Aircraft Pitot-Static Tube with Ice Detection invalid;
   a system that combines three measurements: temperature, thermal conductivity and electrical impedance measurements with a mathematical evaluation of the impedance data to decide what type of contaminant is forming on or in the Aircraft Pitot-Static Tube with Ice Detection and whether the contaminant is ice, sleet, frost, deicer fluid, rain water or snow;
   a system that employs an instrumented Aircraft Pitot-Static Tube with Ice Detection mounted on the outside surface of the aircraft with attached sensors, each of which are connected to equipment in the electronics box, the electronic box mounted internal to the aircrafts exterior surface, data from the sensors used in real time to assess the existence of icing of a particular Aircraft Pitot-Static Tube with Ice Detection, and a system which also stores the sensor data in real time in data storage devices in the electronic box to allow further analysis of the data after the aircraft's flight has been completed;
   a system that analyzes sensor data in real time by means of the computer system contained in the electronic box in the following manner:
   (a) checks the temperature sensor data measured in the body of the Aircraft Pitot-StaticTube with Ice Detection to confirm that the body of the sensor is everywhere below freezing and ice accreation is possible,
   (b) compares measured values of thermal conductivity with reference laboratory measured values at the same temperature, which are stored in the computer system, to evaluate the possibility that ice or other substance is present on and in the Aircraft Pitot-Static Tube with Ice Detection,
   (c) converts the measured impedance data into complex dielectric plane values taking into account the geometry between impedance sensors,
   (d) compares the complex dielectric values and the shape of the complex dielectric trace, derived from the real time impedance measurements, against reference laboratory measured data stored in the onboard computer system to absolutely confirm or reject that the test data being studied is for ice and no other substance: correct values for the intercepts of the trace with the ordinary relative permittivity axis and a distinctive semicircular shaped trace confirming ice and only ice.

* * * * *